US006546977B1

United States Patent
Monyak et al.

(10) Patent No.: US 6,546,977 B1
(45) Date of Patent: Apr. 15, 2003

(54) STUMP GRINDING APPARATUS

(75) Inventors: Kenneth Monyak, Abingdon, VA (US); James Paumier, Canton, OH (US)

(73) Assignee: Sandvik Rock Tools, Inc., Bristol, VA (US)

( * ) Notice: Subject to any disclaimer, the term of this patent is extended or adjusted under 35 U.S.C. 154(b) by 0 days.

(21) Appl. No.: 10/058,073

(22) Filed: Jan. 29, 2002

(51) Int. Cl.[7] .............................. B27C 1/00; A01G 23/06
(52) U.S. Cl. .................... 144/235; 144/24.12; 144/241; 299/79.1; 299/106; 299/107
(58) Field of Search .............................. 144/24.12, 218, 144/223, 231, 235, 241, 230, 334; 83/835, 839, 840; 407/118; 299/39.1, 39.3, 39.7, 79.1, 107, 108, 110, 111, 106; 241/294

(56) References Cited

U.S. PATENT DOCUMENTS

| | | | |
|---|---|---|---|
| 1,472,960 A | * 11/1923 | Conklin | 144/235 |
| 3,153,458 A | 10/1964 | Short | |
| 3,570,566 A | * 3/1971 | McCreery | 144/235 |
| 3,663,063 A | * 5/1972 | Johnmeyer et al. | 299/106 X |
| 4,360,068 A | * 11/1982 | Stephenson | |
| 4,530,385 A | * 7/1985 | York | 144/24.12 |
| 4,709,736 A | * 12/1987 | Bellars | 144/24.12 |
| 4,813,325 A | 3/1989 | Gelman | |
| 4,881,438 A | 11/1989 | Pinney | |
| 4,998,573 A | * 3/1991 | York | 144/241 |
| 5,211,212 A | 5/1993 | Carlson et al. | |
| 5,279,345 A | 1/1994 | LeMaux et al. | |
| 5,355,918 A | * 10/1994 | Lang | 144/24.12 |
| 5,363,891 A | * 11/1994 | Plante | 144/241 |
| 5,435,359 A | 7/1995 | Craft | |
| 5,497,815 A | 3/1996 | Bowling | |
| 5,884,979 A | * 3/1999 | Latham | 299/106 |
| 6,014,826 A | 1/2000 | Walgren et al. | |
| 6,382,277 B1 | * 5/2002 | Paumier et al. | 144/24.12 |

* cited by examiner

Primary Examiner—W. Donald Bray
(74) Attorney, Agent, or Firm—Burns, Doane, Swecker & Mathis, LLP

(57) ABSTRACT

A stump grinding device includes a wheel having an outer peripheral edge in which a plurality of recesses are formed. Disposed in each recess is a plurality of cutting units each including a block affixed to a floor of the recess, and a bit mounted in the block. Each bit includes a hard tip disposed at a front end thereof. The bits of some of the peripheral cutting units are rotatable relative to their respective blocks, with the hard tips thereof being generally pointed. The bits of others of the peripheral cutting units are non-rotatable to their respective blocks, with the hard tips thereof forming elongated cutting edges. The peripheral cutting units are spaced from leading and trailing ends of the respective recesses to provide spaces for the passage of cuttings.

22 Claims, 2 Drawing Sheets

STUMP GRINDING APPARATUS

BACKGROUND OF THE INVENTION

The present invention relates to a tree stump grinding apparatus for disintegrating wood material, such as a tree stump grinder.

Conventional stump grinders are disclosed in U.S. Pat. Nos. 5,279,345 and 5,497,815 for example. A typical tree stump grinder comprises a rotatable wheel having a plurality of cutting units mounted on the sides and the outer periphery of the wheel. As the wheel is rotated, the cutting units are moved into contact with the stump to gradually disintegrate the stump.

A typical cutting unit employed at the outer periphery of the wheel includes a holder (or block) secured to the wheel and a tooth (or bit) mounted in the block. The bit comprises a steel shaft carrying a carbide tip. The blocks are configured so that the bits are inclined at various angles relative to the wheel.

During use of a typical stump grinder, the outer peripheral edge of the wheel is subjected to considerable wear by the cuttings, since the cuttings from the peripheral cutting units (e.g., soil, rocks, wood, etc.) will impact against the outer peripheral edge of the wheel and the blocks. Such wear can significantly shorten the life of the apparatus.

Another problem involves premature breakage of the peripheral cutting bits. It has been common to use bits that are stationary (i.e., non-rotatable) with respect to their respective blocks and whose carbide tips have a flat front face that forms an elongated cutting edge to efficiently shave cuttings from stumps. However, it has been found that such cutting edges are particularly susceptible to being broken upon impacting against rocks embedded in soil surrounding a stump being worked on. Accordingly, many operators have switched to bits having pointed (conical) tips and which are freely rotatable in their blocks. The pointed tips are able to break the rocks, and are essentially self-sharpening due to the bits being freely rotatable. However, those types of bits tend to pulverize and shred the stumps, rather than shaving distinct chips from the stumps, and thus do not cut stumps as efficiently as the stationary bits having elongated cutting edges.

Other shortcomings associated with conventional stump cutters include excess drag imposed on the wheel due to contact between the blocks and the material being cut. Also, since the blocks are of different configurations in order to enable the bits to be oriented at different inclinations relative to the wheel, an operator must keep a large number of blocks in inventory which is expensive and time consuming.

SUMMARY OF THE INVENTION

The present invention relates to a stump grinding apparatus which comprises a wheel that defines a center axis of rotation. The wheel includes axially spaced side surfaces and a circular outer peripheral edge. The peripheral edge defines an outer circumference of the wheel, the outer circumference having a diameter substantially larger than an axial thickness of the wheel. Recesses are formed in the outer peripheral edge, the recesses being spaced circumferentially apart. Each recess includes leading and trailing end walls spaced circumferentially apart, and a floor interconnecting the end walls. Side cutting units are mounted to and project from the side surfaces. A cutting structure is mounted in each of the recesses. Each cutting structure includes at least one peripheral cutting unit comprised of a block affixed to the floor of the recess, and a bit mounted in the block. Each bit includes a shank mounted in a hole formed in the block and a hard tip disposed at a front end of the shank. The tips project past the outer circumference of the wheel. In one aspect of the invention, each cutting structure is spaced from the leading and trailing end walls of its respective recess to form spaces between the cutting structure and the leading and trailing end walls through which cuttings may pass.

In another aspect of the invention, the bits of at least some of the peripheral cutting units are rotatable relative to their respective blocks, with the hard tips thereof being generally pointed. The bits of others of the peripheral cutting units are non-rotatable relative to their respective blocks, with the hard tips thereof forming elongated cutting edges.

BRIEF DESCRIPTION OF THE DRAWINGS

The objects and advantages of the invention will become apparent from the following detailed description of preferred embodiments thereof in connection with the accompanying drawings in which like numerals designate like elements and in which.

DETAILED DESCRIPTION OF PREFERRED EMBODIMENTS OF THE INVENTION

Figure 1:
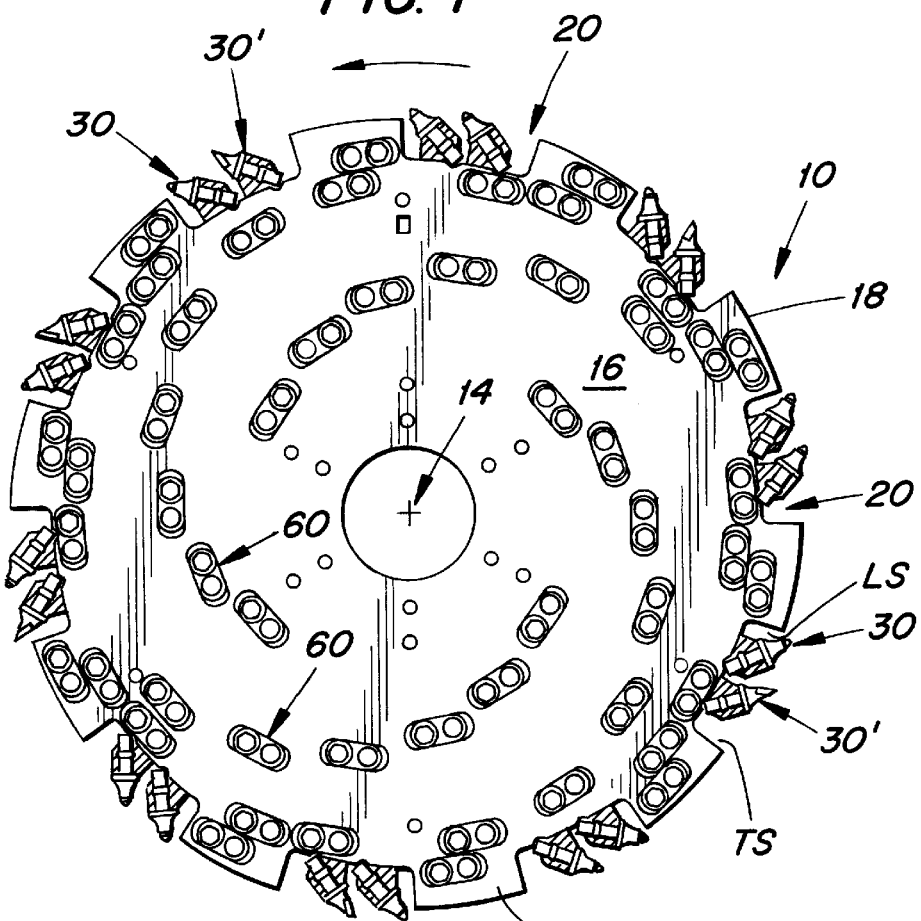
FIG. 1 is a side elevation view of a stump grinding apparatus, partly in section, according to the present invention.

Depicted in FIG. 1 is a stump cutting apparatus 10 according to the invention. The apparatus includes a wheel 12 defining an axis of rotation 14, the rotation occurring in the direction of an arrow R. The wheel includes axially facing sides 16 and a radially outer circular peripheral edge or surface 18. The edge 18 defines an outer circumference of the wheel, wherein a diameter of the outer circumference is substantially larger than an axial thickness of the wheel.

Formed in the outer edge 18 is a plurality of recesses 20 spaced circumferentially apart. Each recess 20 is open in axial and radial directions and includes a floor 22 extending between two circumferentially spaced leading and trailing end walls 24, 26 (see FIG. 2).

Disposed in each recess 20 is a cutting structure 28 preferably including a plurality of peripheral cutting units (although possibly only one peripheral cutting unit could be disposed in the recesses). As will be explained, the cutting structure 28 preferably combines two different types of cutting units 30, 30'. Each of the cutting units 30, 30' includes a block (holder) 32 and cutting bit 34, 34' mounted in the block. The cutting units 30, 30' employ identical blocks 32, but those blocks carry different types of cutting bits, i.e., rotatable bits 34 and non-rotatable bits 34', as will be explained.

Figure 4:
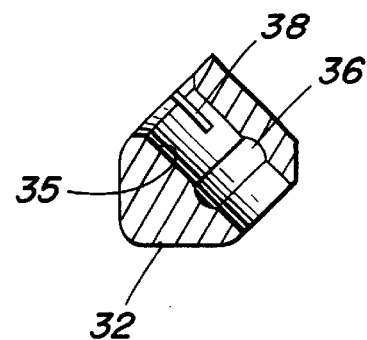
FIG. 4 is a sectional view taken along the line IV—IV of FIG. 3.

Each block 32 is affixed to the floor 22 of the respective recess, preferability by welding. Each bit includes a shank 40, 40' disposed within a hole 35 formed in its block (see FIG. 4), and a hard tip 42, 42' disposed at a front end of the shank. The tips 42, 42' are preferably formed of cemented carbide, such as tungsten carbide, and are brazed to the front end of the respective shanks.

The cutting units are arranged such that the tips thereof (but not the blocks) project past the outer circumference of the wheel. The blocks 32 are all of identical construction, each block 32 including a body whose hole 35 is basically cylindrical and having a radial enlargement 36 adapted to receive an elastic retaining sleeve for rotatably securing some of the bits 34 (i.e., the rotatable bits) in place, as will be explained. A pair of diametrically opposed slots 38 are situated forwardly of the enlargement 36 and communicate with the hole 35. The slots are adapted to receive ribs of some of the bits 34' (i.e., the non-rotatable bits) for securing those bits against rotation as will be explained.

Figure 8:
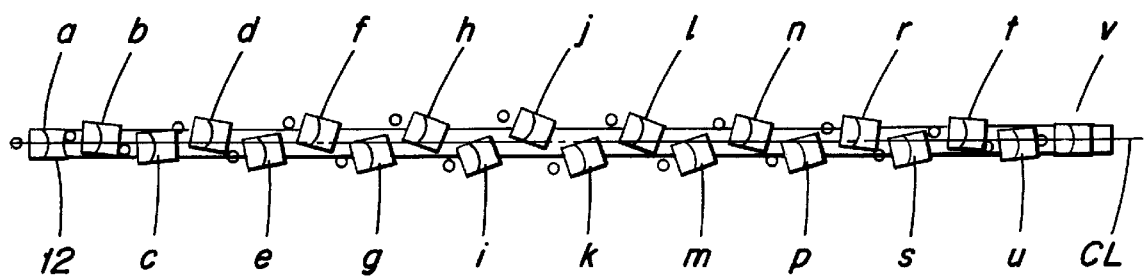
FIG. 8 is a schematic view representing the orientations of the peripheral cutting units relative to a wheel on which they are mounted.

The bits 30, 30' are oriented at various angles relative to the wheel 12, the angular pattern being represented schematically in FIG. 8 for twenty bits. The respective angles which the bits form with a center plane (CL) of the wheel 12 are shown in the following chart, along with a distance of the carbide tips from the center plane. This particular arrangement and number of the bits is not of critical importance and represents only one possible arrangement that could be utilized.

| Bit | Angle | Distance (inches) |
|-----|-------|-------------------|
| a | 0° | 0 |
| b | 5° | .375 |
| c | 5° | .375 |
| d | 5° | .75 |
| e | 5° | .75 |
| f | 10° | 1.00 |
| g | 10° | 1.00 |
| h | 15° | 1.25 |
| i | 15° | 1.25 |
| j | 20° | 1.5 |
| k | 20° | 1.5 |
| l | 15° | 1.25 |
| m | 15° | 1.25 |
| n | 10° | 1.0 |
| p | 10° | 1.0 |
| r | 5° | .75 |
| s | 5° | .75 |
| t | 5° | .375 |
| u | 5° | .375 |
| v | 0° | 0 |

To achieve this angular relationship, the identical blocks 32 are welded to the floors of the respective recesses at different orientations relative to the wheel.

Figure 5:
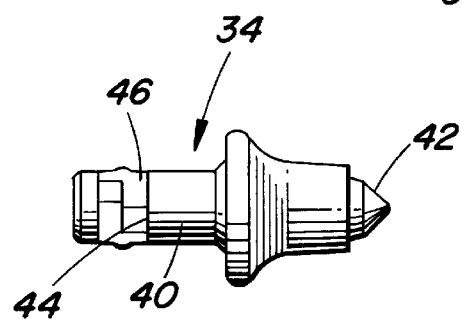
FIG. 5 is a side elevational view of a rotatable type of cutting bit utilized in FIG. 1, showing a retaining sleeve mounted therein.

26 As noted earlier, some of the bits (i.e., bits 34) are freely rotatable in their respective holders, and others (i.e., bits 34') are held against rotation in their holders. A rotatable bit 34 is depicted in FIG. 5. That bit includes the shank 40 and a conical carbide tip 42. The shank is generally cylindrical and includes an annular groove 44 in which a conventional elastic split retaining sleeve 46 is disposed. That retaining sleeve is to be received in the enlargement 36 of the block hole to frictionally secure the bit 34 axially within the hole while permitting the bit 34 to rotate about its center axis.

Figure 6:
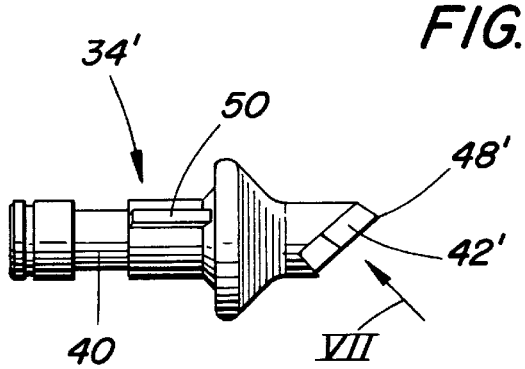
FIG. 6 is a side elevational view of a non-rotatable type of cutting bit, with the retaining sleeve thereof removed.
Figure 7:
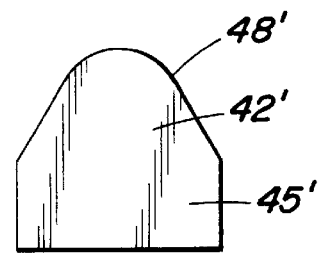
FIG. 7 is a front view of a hard cutting tip of the non-rotatable type bit, as viewed in the direction of arrow VII in FIG. 6.

The stationary (non-rotatable) bit 34' is depicted in FIGS. 6 and 7. That bit 34' includes a shank 40' and a carbide tip 42'. Each non-rotatable bit 34' is axially held in its block 32 by the same type of elastic split retainer sleeve 46 used to retain the rotatable bits 34. The shank 40' includes a pair of diametrically opposite ribs 50 (only one depicted) which are adapted to be received in respective ones of the slots 38 of its respective block in order to prevent the bit 34' from rotating relative to its block. (The rotatable bits 34 do not possess such ribs). Each non-rotatable bit has a generally flat front face 45' (see FIG. 7) which forms an elongated cutting edge 48'. Such an elongated edge 48' tends to be broken when impacting against rocks embedded in the soil adjacent the stumps being cut. However, it has been surprisingly learned that if such bits 34' are combined with rotatable bits 34 having pointed tips, the resulting cutting performance is superior to that of a cutter having only rotatable bits or only non-rotatable bits. The reason is that the pointed tips 42 of the rotatable bits 34 function to shatter the rocks into small pieces which are less able to break the cutting edges 48' of the non-rotatable bits 34'. As a result, the elongated edges 48' of the non-rotatable bits remain capable of shaving large chips off the stump which the pointed tips 42 of the rotatable bits 34 are unable to do.

Accordingly, the efficiencies resulting from the use of non-rotatable bits is obtained without the serious risk of tip breakage that previously happened when using such bits.

Figure 2:
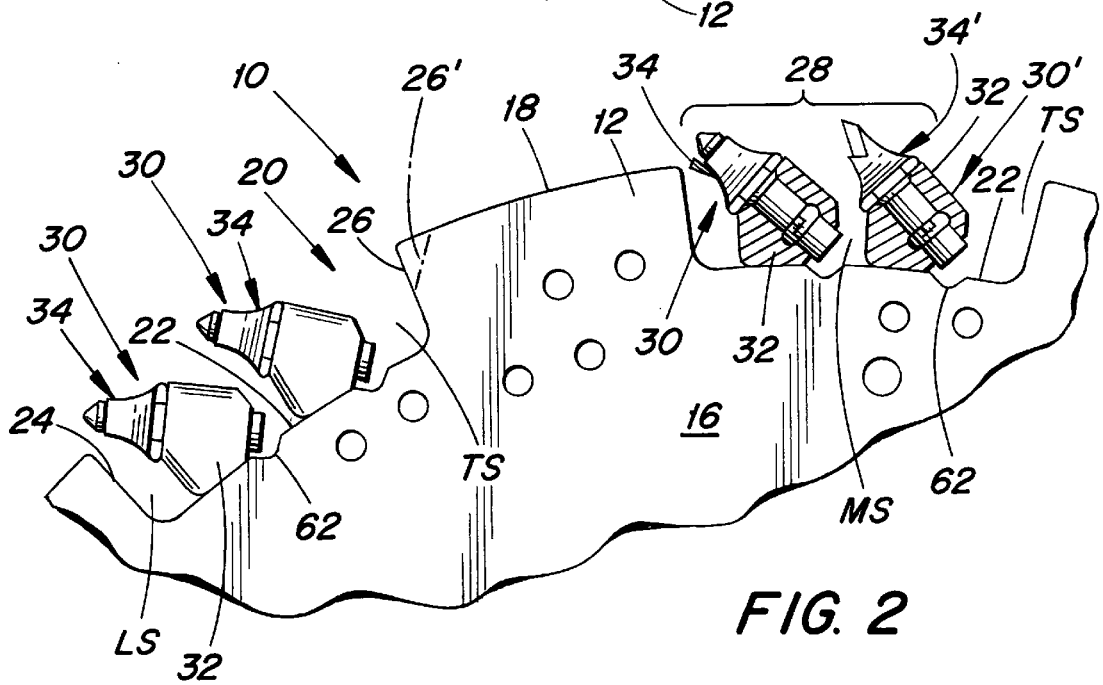
FIG. 2 is an enlarged fragmentary view of a portion of FIG. 1, with the blocks of some cutting units shown in cross section.
Figure 3:
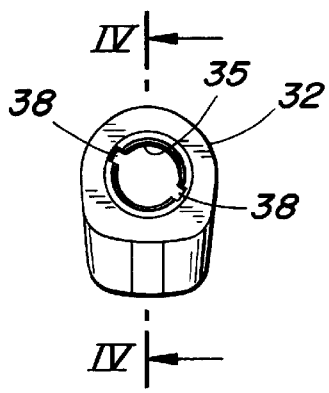
FIG. 3 is a front view of a bit-holding block according to the invention.

In addition, from FIG. 2 it can be seen that the cutting structure 28 disposed within each recess is spaced from the leading and trailing end walls 24, 26. That is, in the case of a cutting structure comprised of two cutting units 30, 30 (or 30, 30'; or 30', 30'), the front cutting unit is spaced from the leading wall 24, and the rear cutting unit is spaced from the trailing wall 26. As a result, leading and trailing spaces LS and TS are formed between the cutting units and the leading and trailing end walls 24, 26, for the purpose of passing cuttings. That is, rather than the cuttings from the peripheral bits impacting forcefully against, and wearing, the outer peripheral edge 18 of the wheel 12 and/or the blocks, the cuttings are instead able to pass through the spaces LS, TS and thereby minimize wear. In cases where there are multiple cutting units in each recess, there is also provided a space MS between the blocks of the cutting units for passing cuttings therebetween. The spaces LS, MS and TS extend inwardly from the outer circumference of the wheel and preferably extend the entire height of the end surfaces 24, 26.

It will be appreciated that the portions of the outer peripheral edge 18 of the wheel situated between successive ones of the recesses 20 can function as depth gauges to limit the extent to which the wheel enters a stump, or the ground. That function is possible since the blocks 32 lie entirely within the outer circumference of the wheel.

The stump cutting apparatus 10 also includes side cutting units 60 disposed on the sides 16. Those units 60 are preferably of the type disclosed in copending U.S. Ser. No. 09/837,231 filed Apr. 19, 2001, the disclosure of which is incorporated by reference herein.

Formed in the floor of each recess 20 are notches 62 which are provided to accommodate the rear ends of exceptionally long bits that might possibly be used.

The leading and trailing end walls 24, 26 of each recess are depicted as generally parallel to one another (i.e., each extending radially relative to the axis of the wheel). Instead, at least the outer portion of the trailing end wall 26 could be oriented at an appreciable angle (e.g. 45°) relative to a radius, as shown by a phantom line 26' in FIG. 2.

In operation, as the stump cutter apparatus 10 is rotated, the peripheral bits 34, 34' and the side units 60 are brought into contact with stumps to gradually disintegrate the stumps. Cuttings from the peripheral bits 34, 34' are able to pass through the spaces LS, TS (and possibly MS if multiple cutting units are disposed in a recess) to minimize wearing of the wheel 12 and the blocks 32.

The stumps are most efficiently cut by the elongated edges of the non-rotatable bits 34,' and those edges are protected from breakage by the pointed rotary bits 34 which function to break rocks that could otherwise damage the cutting edges of the non-rotatable bits.

Since the blocks 32 do not project beyond the outer circumference of the wheel 16, the portions of the edge 18 situated between successive recesses 20 are able to serve as depth gauges to limit a cutting depth of the apparatus.

While the concept of combining rotatable and non-rotatable bits on the same rotary structure has been disclosed herein where the rotary structure is a thin wheel, it would be possible to utilize that concept on the type of stump cutter wherein the rotary structure is an elongated drum having an axial length as large as, or larger than, the drum diameter. In that event, the bits could be mounted on the outer surface of the drum but not necessarily in recesses.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A stump grinding apparatus comprising:
   a wheel defining a center axis of rotation, the wheel including axially spaced side surfaces and a circular outer peripheral edge, the outer peripheral edge defining an outer circumference of the wheel, the outer circumference having a diameter substantially larger than an axial thickness of the wheel, there being a plurality of recesses formed in the outer peripheral edge and spaced circumferentially apart, each recess including leading and trailing end walls spaced circumferentially apart and a floor interconnecting the end walls;
   a plurality of side cutting units mounted to, and projecting from, the side surfaces; and
   a cutting structure mounted in each of the recesses and including at least one peripheral cutting unit comprised of a block affixed to the floor of the recess and a bit mounted in the block, the bit including a shank mounted in a hole formed in the block and a hard tip disposed at a front end of the shank, the tip projecting past the outer circumference of the wheel, each cutting structure, including the block and the bit of each peripheral cutting unit, being spaced from the leading and trailing end walls of its respective recess to form spaces between the cutting structure and the leading and trailing end walls through which cuttings may pass.

2. The stump grinding apparatus according to claim 1 wherein the cutting structure disposed in at least some of the recesses comprises a plurality of the peripheral cutting units.

3. The stump grinding apparatus according to claim 1 wherein the bits of some of the peripheral cutting units are rotatable relative to their respective blocks, with the hard tips thereof being generally pointed; and the bits of others of the peripheral cutting units being non-rotatable with respect to their respective blocks, with the hard tips thereof forming elongated cutting edges.

4. The stump grinding apparatus according to claim 3 wherein all of the blocks are identical.

5. The stump grinding apparatus according to claim 4 wherein the hole of each block is generally cylindrical, there being at least one slot communicating with an outer circumference of the hole and extending parallel to an axis of the hole, each of the non-rotatable bits having a rib projecting from the shank and received in the slot.

6. The stump grinding apparatus according to claim 4 wherein some of the bits project at mutually different angles with respect to the wheel than others of the bits.

7. The stump grinding apparatus according to claim 3 wherein the pointed tips are generally conical.

8. The stump grinding apparatus according to claim 3 wherein the blocks are welded to the floor of the respective recesses.

9. The stump grinding apparatus according to claim 1 wherein the cutting structure disposed in each of at least some of the recesses comprises a plurality of the peripheral cutting units.

10. The stump grinding apparatus according to claim 1 wherein the leading and trailing end walls are generally parallel to one another.

11. The stump grinding apparatus according to claim 1 wherein at least a radially outer portion of each trailing end is inclined at about a forty-five degree angle with respect to a wheel radius.

12. The stump grinding apparatus according to claim 1 wherein all of the blocks are identical.

13. The stump cutting apparatus according to claim 1 wherein the blocks are situated entirely within the outer circumference of the wheel.

14. A stump grinding apparatus comprising:
    a wheel defining a center axis of rotation, the wheel including axially spaced side surfaces and a circular outer peripheral edge, the peripheral edge defining an outer circumference of the wheel, the outer circumference having a diameter substantially larger than an axial thickness of the wheel, there being a plurality of recesses formed in the outer peripheral edge and spaced circumferentially apart, each recess including leading and trailing end walls spaced circumferentially apart and a floor interconnecting the end walls;
    a plurality of side cutting units mounted to, and projecting from, the side surfaces; and
    a cutting structure mounted in each of the recesses and including at least one peripheral cutting unit comprised of a block affixed to the floor of the recess and a bit mounted in the block, the bit including a shank mounted in a hole formed in the block and a hard tip disposed at a front end of the shank, the tip projecting past the outer circumference of the wheel, wherein the bits of some of the peripheral cutting units are rotatable relative to their respective blocks, with the hard tips thereof being generally pointed; and the bits of others of the peripheral cutting units being non-rotatable relative to their respective blocks, with the hard tips thereof forming elongated cutting edges.

15. The stump grinding apparatus according to claim 14 wherein all of the blocks are identical.

16. The stump grinding apparatus according to claim 15 wherein the hole of each block is generally cylindrical, there being at least one slot communicating with an outer circumference of the hole and extending parallel to an axis of the hole, each of the non-rotatable bits having a rib projecting from the shank and received in the slot.

17. The stump grinding apparatus according to claim 14 wherein the pointed tips are generally conical.

18. The stump grinding apparatus according to claim 14 wherein the cutting structure disposed in each of at least some of the recesses comprises a plurality of the peripheral cutting units.

19. A stump grinding apparatus comprising:
a wheel defining a center axis of rotation, the wheel including axially spaced side surfaces and a circular outer peripheral edge, the peripheral edge defining an outer circumference of the wheel, the outer circumference having a diameter substantially larger than an axial thickness of the wheel, there being a plurality of recesses formed in the outer peripheral edge and spaced circumferentially apart, each recess including leading and trailing end walls spaced circumferentially apart and a floor interconnecting the end walls;
a plurality of side cutting units mounted to, and projecting from, the side surfaces; and
a plurality of cutting units mounted in each of the recesses, each cutting unit comprising a block welded to the floor of the recess and a bit mounted in the block, each bit including a shank mounted in a hole formed in its respective block and a hard tip disposed at a front end of the shank, the tips projecting past the outer circumference of the wheel, each block positioned entirely inside of the outer circumference of the wheel, all of the blocks being identical and some blocks being oriented differently relative to the wheel than others of the blocks.

20. A stump grinding apparatus comprising:
a rotary member defining a center axis of rotation, the rotary member including a circular outer peripheral surface, the peripheral surface defining an outer circumference of the rotary member; and
a plurality of cutting units distributed around the outer peripheral surface, each cutting unit comprising a block and a bit mounted in the block, the bit including a shank mounted in a hole formed in the block and a hard tip disposed at a front end of the shank, wherein the bits of some of the cutting units are rotatable relative to their respective blocks, with the hard tips thereof being generally pointed; and the bits of others of the cutting units being non-rotatable relative to their respective blocks, with the hard tips thereof forming elongated cutting edges.

21. A stump grinding apparatus comprising:
a wheel defining a center axis of rotation, the wheel including axially spaced side surfaces and a circular outer peripheral edge, the outer peripheral edge defining an outer circumference of the wheel, the outer circumference having a diameter substantially larger than an axial thickness of the wheel, there being a plurality of recesses formed in the outer peripheral edge and spaced circumferentially apart, each recess including leading and trailing end walls spaced circumferentially apart and a floor interconnecting the end walls;
a plurality of side cutting units mounted to, and projecting from, the side surfaces; and
a cutting structure mounted in each of the recesses and including at least one peripheral cutting unit comprised of a block affixed to the floor of the recess and a bit mounted in the block, the bit including a shank mounted in a hole formed in the block and a hard tip disposed at a front end of the shank, the tip projecting past the outer circumference of the wheel, each cutting structure being spaced from the leading and trailing end walls of its respective recess to form spaces between the cutting structure and the leading and trailing end walls through which cuttings may pass, wherein the cutting structure disposed in at least some of the recesses comprises a plurality of the peripheral cutting units.

22. A stump grinding apparatus comprising:
a wheel defining a center axis of rotation, the wheel including axially spaced side surfaces and a circular outer peripheral edge, the outer peripheral edge defining an outer circumference of the wheel, the outer circumference having a diameter substantially larger than an axial thickness of the wheel, there being a plurality of recesses formed in the outer peripheral edge and spaced circumferentially apart, each recess including leading and trailing end walls spaced circumferentially apart and a floor interconnecting the end walls;
a plurality of side cutting units mounted to, and projecting from, the side surfaces; and
a cutting structure mounted in each of the recesses and including at least one peripheral cutting unit comprised of a block affixed to the floor of the recess and a bit mounted in the block, the bit including a shank mounted in a hole formed in the block and a hard tip disposed at a front end of the shank, the tip projecting past the outer circumference of the wheel, each cutting structure being spaced from the leading and trailing end walls of its respective recess to form spaces between the cutting structure and the leading and trailing end walls through which cuttings may pass, wherein the bits of some of the peripheral cutting units are rotatable relative to their respective blocks, with the hard tips thereof being generally pointed; and the bits of others of the peripheral cutting units being non-rotatable with respect to their respective blocks, with the hard tips thereof forming elongated cutting edges.

* * * * *